United States Patent
Tao et al.

(10) Patent No.: US 6,902,861 B2
(45) Date of Patent: Jun. 7, 2005

(54) INFRARED ABSORBING COMPOUNDS AND THEIR USE IN PHOTOIMAGEABLE ELEMENTS

(75) Inventors: Ting Tao, Fort Collins, CO (US); Kevin B. Ray, Fort Collins, CO (US); Jianbing Huang, Trumbull, CT (US); Jeffrey James Collins, Greeley, CO (US); Thomas Jordan, Windsor, CO (US); Scott A. Beckley, Windsor, CO (US)

(73) Assignee: Kodak Polychrome Graphics, LLC, Norwalk, CT (US)

( * ) Notice: Subject to any disclaimer, the term of this patent is extended or adjusted under 35 U.S.C. 154(b) by 2 days.

(21) Appl. No.: 10/384,989

(22) Filed: Mar. 10, 2003

(65) Prior Publication Data

US 2004/0180285 A1 Sep. 16, 2004

(51) Int. Cl.[7] .............................................. G03F 7/004
(52) U.S. Cl. ................. 430/270.1; 430/281.1; 430/283.1; 430/286.1; 430/287.1; 430/288.1; 430/302; 430/309; 430/401; 430/434; 430/494; 430/944; 430/945; 548/455; 548/517
(58) Field of Search ........................ 430/270.1, 281.1, 430/283.1, 286.1, 287.1, 288.1, 302, 309, 401, 434, 494, 944, 945; 548/455, 517

(56) References Cited

U.S. PATENT DOCUMENTS

| | | | |
|---|---|---|---|
| 4,708,925 A | 11/1987 | Newman | |
| 5,372,907 A | 12/1994 | Haley et al. | |
| 5,700,619 A | 12/1997 | Baumann et al. | |
| 5,763,134 A | 6/1998 | Busman et al. | |
| 5,919,601 A | 7/1999 | Nguyen et al. | |
| 5,965,319 A | 10/1999 | Kobayashi | |
| 6,153,352 A | * 11/2000 | Oohashi et al. | .......... 430/270.1 |
| 6,358,669 B1 | 3/2002 | Savariar-Hauck et al. | |
| 6,391,519 B1 | 5/2002 | Kunita | |
| 6,486,225 B1 | * 11/2002 | Kamata et al. | ............... 522/14 |
| 6,677,106 B2 | * 1/2004 | Blum et al. | ................. 430/302 |

FOREIGN PATENT DOCUMENTS

| | | |
|---|---|---|
| EP | 1 093 934 A1 | 4/2001 |
| WO | WO 00/17711 | 3/2000 |

OTHER PUBLICATIONS

Fryer et al, Study of Acid Diffusion in Resist Near the Glass Transition Temperature, Journal, 1999, pp. 3351–3355, vol. 17(6).

Arai et al, A Sensitive Positive Resist for 0.1–$\mu$m Electron–Beam Direct–Writing Lithography, Journal, 1997, pp. 625–628, vol. 10(4).

Thackeray et al, Following the Acid: Effect of Acid Surface Depletion on Phenolic Polymers, Journal, 1995, pp. 110–123, vol. 614.

Sakamizu et al, Proceedings of SPIE—The International Society for Optical Engineering, Journal, 1997, pp. 448–458, (Abstract).

* cited by examiner

Primary Examiner—Barbara L. Gilliam
(74) Attorney, Agent, or Firm—RatnerPrestia (57) ABSTRACT

Infrared absorbing compounds in which the anion is selected from the group consisting of 5-isatinsulfonate, 10-camphorsulfonate, and 4,5-dihydroxy-1,3-benzenedisulfonate are disclosed. Negative-working imageable elements containing these compounds have improved dot stability.

44 Claims, 2 Drawing Sheets

INFRARED ABSORBING COMPOUNDS AND THEIR USE IN PHOTOIMAGEABLE ELEMENTS

FIELD OF THE INVENTION

The invention relates to lithographic printing. In particular, this invention relates to infrared absorbing compounds and to their use in imageable elements.

BACKGROUND OF THE INVENTION

In lithographic printing, ink receptive regions, known as image areas, are generated on a hydrophilic surface. When the surface is moistened with water and ink is applied, the hydrophilic regions retain the water and repel the ink, and the ink receptive regions accept the ink and repel the water. The ink is transferred to the surface of a material upon which the image is to be reproduced. Typically the ink is first transferred to an intermediate blanket, which in turn transfers the ink to the surface of the material upon which the image is to be reproduced.

Imageable elements useful as lithographic printing plate precursors typically, comprise an imageable layer applied over the hydrophilic surface of a substrate. The imageable layer includes one or more radiation-sensitive components, which may be dispersed in a suitable binder. Alternatively, the radiation-sensitive component can also be the binder material. If, after imaging, the imaged regions of the imageable layer are removed in the developing process revealing the underlying hydrophilic surface of the substrate, the precursor is positive-working. Conversely, if the unimaged regions are removed by the developing process, the precursor is negative-working. In each instance, the regions of the imageable layer (i.e., the image areas) that remain are ink-receptive, and the regions of the hydrophilic surface revealed by the developing process accept water and aqueous solutions, typically a fountain solution, and repel ink.

Imaging of the imageable element with ultraviolet and/or visible radiation is typically carried out through a mask, which has clear and opaque regions. Imaging takes place in the regions under the clear regions of the mask but does not occur in the regions under the opaque regions of the mask. The mask is usually a photographic negative of the desired image. If corrections are needed in the final image, a new mask must be made. This is a time-consuming process. In addition, the mask may change slightly in dimension due to changes in temperature and humidity. Thus, the same mask, when used at different times or in different environments, may give different results and could cause registration problems.

Direct digital imaging of imageable elements, which obviates the need for imaging through a negative, is becoming increasingly important in the printing industry. Negative-working, alkaline developable imageable elements that comprise compounds that form an acid on thermal imaging have been developed for use with infrared lasers. However, dot gain and dot stability is a problem in these systems. Dot gain occurs when the size of a printed dot is larger than the specified size. Dot stability measures the variation in dot size with variation in exposure. In addition, these systems are developed in an aqueous alkaline developer that has a pH of 12 or more. Because of their high pH, disposal of these developers without creating environmental problems can be difficult. In addition, because the developer absorbs carbon dioxide from the air, its activity can change during use.

Thus, a need exists for negative-working imageable elements that can be imaged without exposure through a negative but do not have these disadvantages.

SUMMARY OF THE INVENTION

In one aspect, the invention is an infrared absorbing compound. The infrared absorbing compound has the structure:

STRUCTURE I in which:

$R_1$ and $R_2$ are each independently an alkyl group, an aryl group, an aralkyl group, a hydroxyalkyl group, an alkoxyalkyl group, an aminoalkyl group, a carboxyalkyl group, or a sulfoalkyl group;

Y is hydrogen, halo, alkyl, diphenylamino, or phenylthio;

$Z_1$ and $Z_2$ are each independently a benzo group or a naphtho group;

$Z_3$ is two hydrogen atoms, a cyclohexene residue, or a cyclopentene residue;

$X_1$ and $X_2$ are each independently S, O, NH, $CH_2$, or $C(CH_3)_2$;

A is selected from the group consisting of 5-isatinsulfonate, 10-camphorsulfonate, and 4,5-dihydroxy-1,3-benzenedisulfonate; and n is 1 when A is 10-camphorsulfonate, and n is 2 when A is 5-isatinsulfonate or 4,5-dihydroxy-1,3-benzenedisulfonate.

In another aspect, the invention is an imageable element comprising the infrared absorbing compound. In another aspect, the invention is a method for forming an image by imaging an imageable element with infrared radiation and developing the imaged imageable element with a solvent-based developer. Typically, these imageable elements are heated about 110° C. to 150° C. after imaging but before developing.

Imageable compositions that contain the infrared absorbing compounds of the invention have improved dot stability. That is, these compositions have less variation of dot size with exposure than compositions that contain other infrared absorbing sulfonate salts.

DETAILED DESCRIPTION OF THE INVENTION

Unless the context indicates otherwise, in the specification and claims, the terms binder, polymeric material, sensitizer, infrared absorbing compound, monomer, photoinitiator, coating solvent, and similar terms also include mixtures of such materials. Unless otherwise specified, all percentages are percentages by weight. Thermal imaging refers to imaging with a hot body, such as a thermal head, or with infrared radiation.

Infrared Absorbing Compounds

The structure of the infrared absorbing compounds is shown in Structure I, above. The infrared absorbing compounds comprise a cation that absorbs infrared radiation. Preferably, the cation absorbs infrared radiation in the range of 700 nm to 1200 nm.

$R_1$ and $R_2$ are each independently an alkyl group, an aryl group, an aralkyl group, a hydroxyalkyl group, an alkoxyalkyl group, an aminoalkyl group, a carboxyalkyl group, or a sulfoalkyl group. Typical alkyl groups are pentyl, hexyl, octyl, decyl, cyclohexyl, and alkyl groups of one to four carbon atoms, such as methyl, ethyl, i-propyl, n-propyl, i-butyl, t-butyl and n-butyl. Typical aryl groups are phenyl; substituted phenyl, such as p-methylphenyl (p-tosyl), m-methylphenyl (m-tosyl), o-methylphenyl (o-tosyl), p-methoxyphenyl, p-chlorophenyl, p-bromophenyl, p-cyanophenyl, p-fluorophenyl, pentafluorophenyl, p-trifluoromethylphenyl, 3,5-dimethylphenyl, and 3,5-dichlorophenyl; 1-naphthyl; 2-naphthyl; and substituted 1- and 2-naphthyl. Typical aralkyl groups are benzyl, 2-phenylethyl, and 3-phenyl propyl. Typical hydroxyalkyl groups are 2-hydroxyethyl, 2-hydroxypropyl, 3-hydroxyproyl, 4-hydroxybutyl, and 2,2-dimethyl-2-hydroxyethyl. Typical alkoxyalkyl groups are 2-methoxyethyl, 2-(2-methoxyethyl)ethyl, and 4-methoxybutyl. Typical aminoalkyl groups are 2-aminoethyl, 2-aminopropyl, 3-aminoproyl, and 4-aminobutyl. Typical carboxyalkyl groups are carboxymethyl, 2-carboxyethyl, 2-carboxypropyl, 3-carboxyopropyl, and 4-carboxybutyl. Typical sulfoalkyl groups are 2-sulfoethyl, 3-sulfopropyl, 3-sulfobutyl, and 4-sulfobutyl. $R_1$ and $R_2$ are preferably each independently an alkyl group, more preferably an alkyl group of one to four carbon atoms.

Y is hydrogen, halo, alkyl, diphenylamino, or phenylthio. Typical halo groups are chloro and bromo. Typical alkyl groups are described above. Typically, Y is hydrogen, chloro, phenylthio, or diphenylamino.

$Z_1$, and $Z_2$, are each independently a benzo group or a naphtho group, that is, $Z_1$ and $Z_2$, each independently represent either a benzo moiety or a naphtho moiety.

$Z_3$ is two hydrogen atoms, a cyclohexene residue or a cyclopentene residue. That is, $Z_3$ may represent either a cyclohexene ring or a cyclopentene ring. Alternatively, the compound may be an open chain compound, in which $Z_3$ is two hydrogen atoms. In this case the structure is represented by —CH=C(Y)—CH=.

$X_1$ and $X_2$, are each independently S, O, NH, $CH_2$, or $C(CH_3)_2$. Typically, $X_1$ and $X_2$ are each $C(CH_3)_2$.

A is selected from the group consisting of 4,5-dihydroxy-1,3-benzenedisulfonate, 10-camphorsulfonate, and 5-isatinsulfonate. These sulfonate anions are show below:

n is 1 when A is 10-camphorsulfonate, and n is 2 when A is 5-isatinsulfonate or 4,5-dihydroxy-1,3-benzenedisulfonate.

In one embodiment, $R_1$ and $R_2$ are the same; $Z_1$ and $Z_2$ are the same; and $X_1$ and $X_2$ are the same.

The infrared absorbing compounds may be prepared by mixing a solution of a salt that contains the desired infrared absorbing cation with a solution of a salt that contains the desired sulfonate anion and filtering off the resulting precipitate. The anion of the salt that contains the desired infrared absorbing cation is typically, for example, sulfate, bisulfate, or halide, such as chloride or bromide. The cation of the salt that contains the desired sulfonate anion is typically ammonium, substituted ammonium, for example tetraalkyl ammonium such as tetramethyl ammonium or tetra-n-butyl ammonium, lithium, sodium, or potassium. The solvent may be water or a solvent including a mixture of water and a hydrophilic solvent such as an alcohol, for example methanol, ethanol, or propylene glycol methyl ether.

The infrared absorbing compounds are useful as photothermal conversion materials. Photothermal conversion materials absorb radiation, typically infrared radiation, and convert it to heat. Imageable elements that are to be imaged with infrared radiation typically comprise an infrared absorbing material. Although an infrared absorbing material is not necessary for imaging, imageable elements that contain an infrared absorbing material may also be imaged with hot body, such as a thermal head or an array of thermal heads. In thermally imageable elements that do not comprise an underlayer, the infrared absorbing material may be in the imageable layer and/or in a separate absorber layer between the imageable layer and the substrate. In elements that also comprise an underlayer, the infrared absorbing material may be in the imageable layer, and/or in the underlayer, and/or in a separate absorber layer between the imageable layer and the underlayer.

The amount of infrared absorbing material in the element is generally sufficient to provide an optical density of at least 0.05, and preferably, an optical density of from about 0.5 to about 2 at the imaging wavelength. As is well known to those skilled in the art, the amount of an infrared absorbing material required to produce a particular optical density can be determined from the thickness of the layer, the concentration of infrared absorbing material in the layer, and the extinction coefficient of the infrared absorbing material at the wavelength used for imaging using Beer's law.

Imageable Elements

The imageable element comprises an imageable layer, which comprises an imageable composition, over the surface of a substrate. Other layers that are conventional components of imageable elements may also be present. For example, the imageable layer may be on the substrate, or other layers, such as an underlayer or an absorber layer, may be present between the imageable layer and the substrate.

Negative Working Imageable Elements

The imageable composition may be a negative working imageable composition. These compositions comprise the infrared absorbing compound, also called the photothermal conversion material; an acid generator; an acid activatable crosslinking agent; and a polymeric binder. Other ingredients that are conventional ingredients of negative working imageable compositions may also be present. These compositions are disclosed, for example, in Haley, U.S. Pat. No. 5,372,907; Nguyen, U.S. Pat. No. 5,919,601; Kobayashi, U.S. Pat. No. 5,965,319; Busman, U.S. Pat. No. 5,763,134, and WO 00/17711, the disclosures of which are all incorporated herein by reference.

Acid Generators

Acid generators are precursors that form a Bronsted acid by thermally initiated decomposition. Non-ionic acid generators include, for example, haloalkyl-substituted s-triazines, which are described, for example, in Smith, U.S. Pat. No. 3,779,778. Haloalkyl-substituted s-triazines are s-triazines substituted with one to three $CX_3$ groups in which is X is bromo or, preferably, chloro. Examples include 2-phenyl-4,6-bis(trichloromethyl)-s-triazine, 2,4,6-tris(trichloromethyl)-s-triazine, 2-methyl-4,6-bis(trichloromethyl)-s-triazine, 2-styryl-4,6-bis(trichloromethyl)-s-triazine, 2-(p-methoxystyryl)-4,6-bis(trichloromethyl)-s-triazine, 2-(4-methoxy-naphtho-1-yl)-4,6-bis-trichloromethyl-s-triazine, 2-(4-ethoxy-naphtho-1-yl)-4,6-bis-trichloromethyl-s-triazine, and 2-[4-(2-ethoxyethyl)-naphtho-1-yl]-4,6-bis-trichloromethyl-s-triazine.

Ionic acid generators include, for example, onium salts in which the onium cation is iodonium, sulphonium, phosphonium, oxysulphoxonium, oxysulphonium, sulphoxonium, ammonium, diazonium, selenonium, or arsonium, and the anion is a chloride, bromide, or a non-nucleophilic anion such as tetra-fluoroborate, hexafluorophosphate, hexafluoroarsenate, hexafluoroantimonate, triflate, tetrakis(pentafluoro-phenyl) borate, pentafluoroethyl sulfonate, p-methyl-benzyl sulfonate, ethyl sulfonate, trifluoromethyl acetate, and pentafluoroethyl acetate. Typical onium salts include, for example, diphenyl iodonium chloride, diphenyl iodonium hexafluorophosphate, diphenyl iodonium hexafluoroantimonate, 4,4'-dicumyl iodonium chloride, 4,4'-dicumyl iodonium hexafluorophosphate, N-methoxy-a-picolinium-p-toluene sulfonate, 4-methoxybenzenediazonium tetrafluoroborate, 4,4'-bis-dodecylphenyl iodonium-hexafluorophosphate, 2-cyanoethyl-triphenylphosphonium chloride, bis-[4-diphenylsulfoniophenyl]sulfide-bis-hexafluorophosphate, bis-4-dodecylphenyliodonium hexafluoroantimonate, triphenyl sulfonium hexafluoroantimonate, triphenyl sulfonium tetrafluoroborate, 2-methoxy-4-aminophenyl diazonium hexafluorophosphate, phenoxyphenyl diazonium hexafluoroantimonate, and anilinophenyl diazonium hexafluoroantimonate.

Particularly useful ionic acid generators include iodonium, sulfonium, and diazonium salts in which the anion is an organic sulfate or thiosulfate, such as, for example, methyl sulfate or thiosulfate, ethyl sulfate or thiosulfate, hexyl sulfate or thiosulfate, octyl sulfate or thiosulfate, decyl sulfate or thiosulfate, dodecyl sulfate and thiosulfate, trifluoromethyl sulfate or thiosulfate, benzyl sulfate or thiosulfate, pentafluorophenyl sulfate and thiosulfate. Typical acid generators include, for example, diphenyl iodonium octyl sulfate, diphenyl iodonium octyl thiosulfate, triphenyl sulfonium octyl sulfate, 4,4'-dicumyl iodonium p-tolyl sulfate, 2-methoxy-4-(phenylamino)-benzenediazonium octyl sulfate, 2-methoxy-4-(phenylamino)-benzenediazonium hexadecyl sulfate, 2-methoxy-4-(phenylamino)-benzenediazonium dodecyl sulfate, and 2-methoxy-4-(phenylamino)-benzenediazonium vinyl benzyl thiosulfate. These acid generators can be prepared by mixing an onium salt, such as an onium chloride, bromide, or bisulfate, containing the desired onium cation with a sodium or potassium salt containing the desired anion, i.e. the desired alkyl or aryl sulfate or thiosulfate, either in water or in an aqueous solvent including a hydrophilic solvent such as an alcohol, for example methanol, ethanol, or propylene glycol methyl ether.

Crosslinking Agents and Polymeric Binders

Acid-activatable crosslinking agents may comprise at least two acid-activatable reactive groups, such as the hydroxymethyl group, the alkoxymethyl group, the epoxy group, and the vinyl ether group, bonded to an aromatic ring. Examples include methylol melamine resins, resole resins, epoxidized novolac resins, and urea resins. Other examples are amino resins having at least two alkoxymethyl groups (e.g. alkoxymethylated melamine resins, alkoxymethylated glycolurils and alkoxymethylated benzoguanamines). Phenol derivatives comprising at least two groups such as the hydroxymethyl group and/or the alkoxymethyl group provide good fastness in an image portion when an image is formed. Examples of phenol derivatives include resole resins. Resole resins include, for example, GP649D99 resole (Georgia Pacific) and BKS-5928 resole resin (Union Carbide).

Resole resins are obtained by reaction of phenolic compounds with aldehydes, but under different reaction conditions than those that produce novolac resins. A typical example of a resole resin useful with novolac resins is the resole resin prepared from bis-phenol A and formaldehyde.

Phenol derivatives having a hydroxymethyl group can be prepared by reaction of a phenol without a hydroxymethyl group and formaldehyde in the presence of a base catalyst. Preferably, the reaction temperature is 60° C. or less to prevent resinification or gelation of the phenol derivative. Phenol derivatives having an alkoxymethyl group can be prepared by acid catalyzed reaction of the phenol derivative having a hydroxymethyl group with an alcohol. Preferably, the reaction temperature is 100° C. or less to prevent resinification or gelation of the phenol derivative. These phenol derivatives, especially phenol derivatives having an alkoxymethyl group, have superior storage properties.

The acid activatable crosslinking agent used in the composition may depend on the polymeric binder. Any combination of acid activatable crosslinking agent and polymeric binder that can react to form an image under the imaging and processing conditions may be used. Various combinations of polymeric binder and acid activatable crosslinking agent are known in the art. In general, the binder is a polymer, or mixture of polymers, capable of undergoing an acid-catalyzed condensation reaction with the crosslinking agent when the element is heated to 60–220° C.

Novolac resins are typically prepared by condensation of a phenol, such as phenol, m-cresol, o-cresol, p-cresol, etc, with an aldehyde, such as formaldehyde, paraformaldehyde, acetaldehyde, etc. or a ketone, such as acetone, in the presence of an acid catalyst. One of two processes, the solvent condensation process and the hot melt condensation process, is typically used. Typical novolac resins include, for example, phenol-formaldehyde resins, cresol-formaldehyde resins, phenol-cresol-formaldehyde resins, p-t-butylphenol-formaldehyde resins, and pyrogallol-acetone resins. A useful novolac resin for use in this invention is the resin prepared from m-cresol and formaldehyde. Acrylic polymers having an alkaline-soluble group include those that contain a monomer that has an acidic group such as carboxyl group or a hydroxyphenyl group. Examples of acrylic copolymers having an alkaline-soluble group include methacrylic acid-allylmethacrylate copolymers, methacrylic acid-benzylmethacrylate copolymers, methacrylic acid-hydroxyethyl methacrylate copolymers, poly (hydroxyphenyl methacrylamide), poly (hydroxyphenylcarbonyloxyethyl acrylate), and poly(2,4-dihydroxyphenyl carbonyloxyethyl acrylate). Polymers whose component units include 1 mol % or more of (meth) acrylic acid, hydroxystyrene, and/or hydroxyphenyl (meth) acrylamide based on the total component units and whose weight-average molecular weight is 2,000 to 500,000, preferably 4,000 to 300,000 are preferred. Preferred urethane polymers have 1 mol % or more of a monomer having an acidic group, such as carboxylic acid or a hydroxyphenyl group. Examples are polymers prepared by reaction of diphenylmethane diisocyanate, hexamethylene diisocyanate, and/or tetraethylene glycol, with 2,2-bis (hydroxymethyl) propionic acid.

Haley, U.S. Pat. No. 5,372,907, discloses a radiation-sensitive composition that is sensitive to both ultraviolet/visible and infrared radiation. The composition comprises a resole resin and a novolac resin. In these compositions, the novolac resin is the polymeric binder and the resole resin is the acid-activatable crosslinking agent. Nguyen, U.S. Pat. No. 5,919,601, discloses radiation-sensitive compositions imageable by infrared and ultraviolet/visible radiation. These compositions comprise (1) a polymeric binder containing reactive pendant groups selected from hydroxy, carboxylic acid, sulfonamide, and alkoxymethylamides; and (2) a resole resin, a $C_1$–$C_5$ alkoxymethyl melamine or glycoluril resin, a poly($C_1$–$C_5$-alkoxy-methylstyrene), a poly($C_1$–$C_5$-alkoxymethylacrylamide), a derivative thereof, or a combination thereof. Preferably, the crosslinking resin is a resole resin prepared from a $C_1$–$C_5$ alkylphenol and formaldehyde; a tetra $C_1$–$C_5$-alkoxymethyl glycoluril; a polymer of (4-methoxymethylstyrene); a polymer of (N-methoxymethyl) acrylamide; a polymer of (N-i-butoxymethyl)acrylamide; or a butylated phenolic resin. Kobayashi, U.S. Pat. No. 5,965,319, discloses a negative working recording material comprising an acid activatable crosslinking agent, preferably having at least two hydroxymethyl or alkoxymethyl groups bonded to a benzene ring and a polymer compound having an alkaline-soluble group such as a novolac resin. Typical crosslinking agents are phenols containing hydroxymethyl groups, prepared by condensation of phenols with formaldehyde. Busman, U.S. Pat. No. 5,763,134, discloses activatable crosslinking agents, such as 1,3,5-trihydroxymethylbenzene, 1,3,5-triacetoxymethylbenzene, and 1,2,4,5-tetraacetoxymethylbenzene. Other polymeric binders and acid activatable crosslinking agents will be apparent to those skilled in the art.

It has been found that certain of these imageable elements can be efficiently developed with solvent based developers so that the use of high pH developers, which present a disposal problem and can absorb carbon dioxide from the air during use causing deterioration of the developer, is not necessary. The following binders, for example, can be used in negative working elements that can be developed in solvent based developers:

(a) Copolymers that contain about 25 to about 75 mol %, preferably about 35 to about 60 mol % of N-phenylmaleimide; about 10 to about 50 mol %, preferably about 15 to about 40 mol % of methacrylamide; and about 5 to about 30 mol %, preferably about 10 to about 30 mol %, of methacrylic acid. These copolymers are disclosed in Shimazu, U.S. Pat. No. 6,294,311, incorporated herein by reference.

(b) Copolymers that contain a reactive pendent group capable of undergoing acid crosslinking, in which the reactive pendent group is carboxylic acid, sulfonamide, or alkoxymethyl amide. Typical copolymers include, for example, poly(4-hydroxystyrene/methyl methacrylate), poly (2-hydroxyethyl methacrylate/cyclohexyl methacrylate), poly(2-hydroxyethyl methacrylate/methyl methacrylate), poly(styrene/butyl methacrylate/methyl methacrylate/ methacrylic acid), poly(butyl methacrylate/methacrylic acid), poly(vinylphenol/2-hydroxyethyl methacrylate), poly (styrene/n-butyl methacrylate/2-hydroxyethyl methacrylate/ methacrylic acid), poly(styrene/ethyl methacrylate/2-hydroxyethyl methacrylate/methacrylic acid, poly(N-methoxymethyl methacrylamide/2-phenylethyl methacrylate/methacrylic acid), poly(2-hydroxyethyl methacrylate/cyclohexyl methacrylate/methacrylic acid), poly(N-methoxymethyl methacrylamide/2-phenylethyl methacrylate/methacrylamide/methacrylic acid), poly(N-methoxymethyl methacrylamide/styrene/butyl methacrylate/methacrylic acid), poly(N-iso-butoxymethyl acrylamide/2-hydroxyethyl methacrylate/methyl methacrylate), poly(styrene/n-butyl methacrylate/ methacrylic acid/N-iso-butoxymethyl methacrylamide), and poly(methyl methacrylate/styrene/methacrylic acid. These copolymers are disclosed in Nguyen, U.S. Pat. No. 5,919, 601, incorporated herein by reference.

(c) Functionalized polyvinyl alcohols in which 10 mol % to 60 mol % of the hydroxyl groups are unfunctionalized; about 1 mol % to 30 mol % of the hydroxyl groups are functionalized with —$OCOR_3$ groups; 5 mol % to 60 mol % of the hydroxyl groups are functionalized with an aldehyde of the structure $R_4CHO$; 0 mol % to 60 mol % of the hydroxyl groups are functionalized with an aldehyde of the structure $R_5CHO$; and 1 mol % to 40 mol % of the hydroxyl groups are functionalized with an aldehyde that contains a carboxyl group, such as an aldehyde of the structure $OCYCO_2H$ or $OCXN(R_6)C(O)YCO_2H$; in which X is an aliphatic, aromatic, or araliphatic spacer group; Y is a saturated or unsaturated chain- or ring-shaped spacer group; $R_3$, $R_4$, and $R_5$ are each hydrogen or an alkyl group of one to eighteen carbon atoms; and $R_6$ is hydrogen or an aliphatic, aromatic, or araliphatic group. $R_3$ is typically methyl. $R_4$ and $R_5$ are typically alkyl groups of one to four carbon atoms, such as methyl, ethyl, propyl, or butyl. $R_6$ is typically hydrogen or methyl. X is typically —$CH_2$—, —CH ($CH_3$)—, and —$(CH_2)_3$—. Y is typically —$CH_2CH_2$—, —CH=CH—, 1,2-phenylene, or 1,4-phenylene. Some of these polymers are disclosed in Baumann, U.S. Pat. No. 5,700,619, incorporated herein by reference.

(d) Sulfonyl amido substituted phenolic resins. These binders have the structure:

Each $R_7$ is either hydrogen or —C(O)—NH—SO2-$R_{11}$ with the proviso that at least 20 mol %, preferably 50 mol %, more preferably 80 mol %, of the $R_7$ groups are —C(O)—NH—SO2—$R_{11}$. $R_{11}$ is alkyl, aryl, or aralkyl. Typical alkyl groups are pentyl, hexyl, octyl, decyl, cyclohexyl, and alkyl groups of one to four carbon atoms, such as methyl, ethyl, i-propyl, n-propyl, i-butyl, t-butyl and n-butyl. Typical aryl groups are phenyl; substituted phenyl, such as p-methylphenyl (p-tosyl), m-methylphenyl (m-tosyl), o-methylphenyl (o-tosyl), p-methoxyphenyl, p-chlorophenyl, p-bromophenyl, p-cyanophenyl, p-fluorophenyl, pentafluorophenyl, p-trifluoromethylphenyl, 3,5-dimethylphenyl, and 3,5-dichlorophenyl; 1-naphthyl; 2-naphthyl; and substituted 1- and 2-naphthyl. Typical aralkyl groups are benzyl, 2-phenylethyl, and 3-phenyl propyl. $R_{11}$ is preferably phenyl, p-methylphenyl, or an alkyl group of one to four carbon atoms.

Each $R_8$ is hydrogen or alkyl. Typical alkyl groups are listed above. $R_8$ is typically either hydrogen or m- or p-methyl.

Each $R_9$ and $R_{10}$ is independently hydrogen or alkyl. Alkyl groups are listed above. Typically, each $R_9$ and $R_{10}$ is independently hydrogen or methyl, more typically hydrogen.

n is greater than 20, typically greater than 50.

These polymeric binders may be prepared by reaction of a sulfonyl isocyanate with a novolac resin, such as the novolac resin formed by the reaction of m-cresol and formaldehyde. Typical sulfonyl isocyanates are methyl sulfonyl isocyanate, benzene sulfonyl isocyanate, o-toluene sulfonyl isocyanate, m-toluene sulfonyl isocyanate, and p-toluene sulfonyl isocyanate. Typically at least 20 mol %, preferably at least 50 mol %, more preferably at least 80 mol %, of the phenolic hydroxyl groups of the novolac resin are converted to sulfonyl amido groups.

Other Ingredients

The imageable composition may also comprise other ingredients such as dyes and surfactants that are conventional ingredients of imageable compositions. Surfactants may be present in the imageable composition as, for example, coating aids. A dye may be present to aid in the visual inspection of the imaged and/or developed element. Printout dyes distinguish the imaged regions from the unimaged regions during processing. Contrast dyes distinguish the unimaged regions from the imaged regions in the developed imageable element. Preferably the dye does not absorb the imaging radiation. Triarylmethane dyes, such as ethyl violet, crystal violet, malachite green, brilliant green, Victoria blue B, Victoria blue R, Victoria pure blue BO, and D11 (PCAS, Longjumeau, France), may act as a contrast dye.

The negative working imageable composition typically comprises about 0.1 to 20% by weight, preferably about 0.5 to 10% by weight, of the infrared absorbing compound based on the total weight of the composition. The imageable composition typically comprises about 0.01 to 50% by weight, preferably about 0.1 to 25% by weight, and more preferably about 0.5 to 20% by weight of the acid generator, based on the total weight of the composition. The imageable composition typically comprises about 5 to 70% by weight, and preferably about 10 to 65% by weight of the crosslinking agent based on the total weight of the composition. The imageable composition typically comprises about 10 to 90% by weight, preferably about 20 to 85% by weight, and more preferably about 30 to 80% by weight of the polymeric binder based on the total weight of the composition.

Positive Working Imageable Elements

The infrared absorbing compounds may be used as the photothermal conversion materials in positive working imageable compositions. Positive working thermally imageable elements in which the imageable composition comprises a polymeric material and a dissolution inhibitor are known. The polymeric material is a water insoluble and alkali soluble binder, such as is discussed above, typically a phenolic resin, such as a novolac resin. The dissolution inhibitors are believed not to be photoreactive to radiation of about 600 nm to about 1200 nm, preferably about 800 nm to about 1200 nm, the radiation typically used for imaging thermally imageable elements. The element may comprise an underlayer between the imageable layer and the substrate. The infrared absorbing compound may be present in the imageable layer, in an underlayer, or in a separate absorber layer between the imageable layer and the underlayer if the underlayer is present, or between the underlayer and the substrate if the underlayer is not present. Such systems are disclosed in, for example, Parsons, U.S. Pat. No. 6,280,899; Shimazu, U.S. Pat. No. 6,294,311, and U.S. Pat. No. 6,352,812; and Savariar-Hauck, U.S. Pat. No. 6,358,669.

Useful polar groups for dissolution inhibitors include, for example, diazo groups; diazonium groups; keto groups; sulfonic acid ester groups; phosphate ester groups; triarylmethane groups; onium groups, such as sulfonium, iodonium, and phosphonium; groups in which a nitrogen atom is incorporated into a heterocyclic ring; and groups that contain a positively charged atom, especially a positively charged nitrogen atom, typically a quaternized nitrogen atom, i.e., ammonium groups. Compounds that contain a positively charged (i.e., quaternized) nitrogen atom useful as dissolution inhibitors include, for example, tetraalkyl ammonium compounds, and quaternized heterocyclic compounds such as quinolinium compounds, benzothiazolium compounds, pyridinium compounds, and imidazolium compounds. Compounds containing other polar groups, such as ether, amine, azo, nitro, ferrocenium, sulfoxide, sulfone, and disulfone may also be useful as dissolution inhibitors.

A preferred group of dissolution inhibitors are triarylmethane dyes, such as ethyl violet, crystal violet, malachite green, brilliant green, Victoria blue B, Victoria blue R, and Victoria blue BO. These compounds can also act as contrast dyes, which distinguish the unimaged regions from the imaged regions in the developed imageable element. The dissolution inhibitor may be a monomeric and/or polymeric compound that comprises an o-diazonaphthoquinone moiety.

When a dissolution inhibitor is present in the imageable layer, it typically comprises at least about 0.1 wt %, typically about 0.5 wt % to about 30 wt %, preferably about 1 wt % to 15 wt %, based on the dry weight of the layer.

Alternatively, or additionally, the polymeric material in the imageable layer can comprise polar groups that act as acceptor sites for hydrogen bonding with the hydroxy groups present in the polymeric material and, thus, act as a both the polymeric material and dissolution inhibitor. The level of derivatization should be high enough that the polymeric material acts as a dissolution inhibitor, but not so high that, following thermal imaging, the polymeric material is not soluble in the developer. Although the degree of derivatization required will depend on the nature of the polymeric material and the nature of the moiety containing the polar groups introduced into the polymeric material, typically about 0.5 mol % to about 5 mol %, preferably about 1 mol % to about 3 mol %, of the hydroxyl groups will be derivatized. Derivatization of phenolic resins with compounds that contain the diazonaphthoquinone moiety is well known and is described, for example, in West, U.S. Pat. Nos. 5,705,308, and 5,705,322.

One group of polymeric materials that comprise polar groups and function as dissolution inhibitors are derivatized phenolic polymeric materials in which a portion of the phenolic hydroxyl groups have been converted to sulfonic acid esters, preferably phenyl sulfonates or p-toluene sulfonates. Derivatization can be carried by reaction of the polymeric material with, for example, a sulfonyl chloride such as p-toluene sulfonyl chloride in the presence of a base such as a tertiary amine. A useful material is a novolac resin in which about 1 mol % to 3 mol %, preferably about 1.5 mol % to about 2.5 mol %, of the hydroxyl groups have been converted to phenyl sulfonate or p-toluene sulfonate (tosyl) groups.

When the imageable element comprises an underlayer, the polymeric material in the underlayer is preferably soluble in an alkaline developer. In addition, this polymeric material is preferably insoluble in the solvent used to coat the imageable layer so that the imageable layer can be coated over the underlayer without dissolving the underlayer. Polymeric materials useful in the underlayer include those that contain an acid and/or phenolic functionality, and mixtures of such materials. Useful polymeric materials include carboxy functional acrylics, vinyl acetate/crotonate/vinyl neodecanoate copolymers, styrene maleic anhydride copolymers, phenolic resins, maleated wood rosin, and combinations thereof. Underlayers that provide resistance both to fountain solution and aggressive washes are disclosed in Shimazu, U.S. Pat. No. 6,294,311, incorporated herein by reference.

Particularly useful polymeric materials are copolymers of N-phenylmaleimide, methacrylamide, and methacrylic acid, more preferably those that contain about 25 to about 75 mol %, preferably about 35 to about 60 mol % of N-phenylmaleimide; about 10 to about 50 mol %, preferably about 15 to about 40 mol % of methacrylamide; and about 5 to about 30 mol %, preferably about 10 to about 30 mol %, of methacrylic acid. Other hydrophilic monomers, such as hydroxyethyl methacrylate, may be used in place of some or all of the methacrylamide. Other alkaline soluble monomers, such as acrylic acid, may be used in place of some or all of the methacrylic acid.

The infrared absorbing compound may be in the imageable layer, a separate absorber layer, and/or an underlayer. When an absorber layer is present, it is between the imageable layer and the substrate. When an underlayer is also present, the absorber layer is between the imageable layer and the underlayer. It preferably consists essentially of the infrared absorbing compound and, optionally, a surfactant. It may be possible to use less of the infrared absorbing compound if it is present in a separate absorber layer rather than either the underlayer and/or the imageable layer. When an absorber layer is present, the imageable layer is preferably substantially free of infrared absorbing compound, i.e.

the imageable layer preferably does not absorb radiation used for imaging, typically radiation in the range of 800 nm to 1200 nm. The absorber layer preferably has a thickness sufficient to absorb at least 90%, preferably at least 99%, of the imaging radiation. Typically, the absorber layer has a coating weight of about 0.02 $g/m^2$ to about 2 $g/m^2$, preferably about 0.05 $g/m^2$ to about 1.5 $g/m^2$. As described above, the amount of infrared absorbing compound in the element is generally sufficient to provide an optical density of at least 0.05, and preferably, an optical density of from about 0.5 to about 2 at the imaging wavelength.

Substrate

The imageable composition may be coated over a variety of substrates. The particular substrate will generally be determined by the intended application. For lithographic printing, the substrate comprises a support, which may be any material conventionally used to prepare imageable elements useful as lithographic printing plates. The support is preferably strong, stable and flexible. It should resist dimensional change under conditions of use so that color records will register in a full-color image. Typically, it can be any self-supporting material, including, for example, polymeric films such as polyethylene terephthalate film, ceramics, metals, or stiff papers, or a lamination of any of these materials. Metal supports include aluminum, zinc, titanium, and alloys thereof.

Typically, polymeric films contain a sub-coating on one or both surfaces to modify the surface characteristics to enhance the hydrophilicity of the surface, to improve adhesion to subsequent layers, to improve planarity of paper substrates, and the like. The nature of this layer or layers depends upon the substrate and the composition of subsequent coated layers. Examples of subbing layer materials are adhesion-promoting materials, such as alkoxysilanes, aminopropyltriethoxysilane, glycidoxypropyltriethoxysilane and epoxy functional polymers, as well as conventional subbing materials used on polyester bases in photographic films.

The surface of an aluminum support may be treated by techniques known in the art, including physical graining, electrochemical graining, chemical graining, and anodizing. The substrate should be of sufficient thickness to sustain the wear from printing and be thin enough to wrap around a printing form, typically from about 100 $\mu$m to about 600 $\mu$m. Typically, the substrate comprises an interlayer between the aluminum support and the layer of imageable composition. The interlayer may be formed by treatment of the support with, for example, silicate, dextrine, hexafluorosilicic acid, phosphate/fluoride, polyvinyl phosphonic acid (PVPA) or vinyl phosphonic acid copolymers.

The back side of the substrate (i.e., the side opposite the underlayer and layer of imageable composition) may be coated with an antistatic agent and/or a slipping layer or matte layer to improve handling and "feel" of the imageable element. Typically, the imageable layer has a coating weight of about 0.5 to about 4 $g/m^2$, preferably 0.8 to 3 $g/m^2$.

Preparation of the Imageable Element

The imageable element may be prepared by sequentially applying the underlayer, if present, over the hydrophilic surface of the substrate; applying the absorber layer or the barrier layer, if present, over the underlayer; and then applying the imageable layer using conventional techniques.

The terms "solvent" and "coating solvent" include mixtures of solvents. These terms are used although some or all of the materials may be suspended or dispersed in the solvent rather than in solution. Selection of coating solvents depends on the nature of the components present in the various layers.

The underlayer, if present, may be applied by any conventional method, such as coating or lamination. Typically the ingredients are dispersed or dissolved in a suitable coating solvent, and the resulting mixture coated by conventional methods, such as spin coating, bar coating, gravure coating, die coating, or roller coating.

The imageable layer is applied to the substrate or, if present, over the underlayer. If an underlayer is present, to prevent these layers from dissolving and mixing, the imageable layer should be coated from a solvent in which the underlayer layer is essentially insoluble. Thus, the coating solvent for the imageable layer should be a solvent in which the components of the imageable layer are sufficiently soluble that the imageable layer can be formed and in which any underlying layers are essentially insoluble. Typically, the solvents used to coat the underlying layers are more polar than the solvent used to coat the imageable layer. An intermediate drying step, i.e., drying the underlayer, if present, to remove coating solvent before coating the imageable layer over it, may also be used to prevent mixing of the layers. Alternatively, the underlayer, the imageable layer or both layers may be applied by conventional extrusion coating methods from a melt mixture of layer components. Typically, such a melt mixture contains no volatile organic solvents.

Imaging and Processing

The element may be thermally imaged with a laser or an array of lasers emitting modulated near infrared or infrared radiation in a wavelength region that is absorbed by the imageable element. Infrared radiation, especially infrared radiation in the range of about 800 nm to about 1200 nm, is typically used for imaging. Imaging is conveniently carried out with a laser emitting at about 830 nm, about 1056 nm, or about 1064 nm. Suitable commercially available imaging devices include image setters such as the Creo Trendsetter (CREO, British Columbia, Canada) and the Gerber Crescent 42T (Gerber).

Alternatively, the imageable element may be thermally imaged using a hot body, such as a conventional apparatus containing a thermal printing head. A suitable apparatus includes at least one thermal head but would usually include a thermal head array, such as a TDK Model No. LV5416 used in thermal fax machines and sublimation printers or the GS618-400 thermal plotter (Oyo Instruments, Houston, Tex., USA).

After the imaging, the imaged negative working elements that comprise the infrared absorbing compound, an acid generator; an acid activatable crosslinking agent; and a polymeric binder may be heated. This optional heating step can be carried out by radiation, convection, contact with heated surfaces, for example, with rollers, or by immersion in a heated bath comprising an inert liquid, for example, water. Preferably, the imaged imageable element is heated in an oven.

The heating temperature is typically determined by the fog point of the imageable element. The fog point is defined as the lowest temperature, at a heating time of two minutes, required to render a thermally imageable element non-processable. When the imaged imageable element is heated above the fog point, the unimaged regions crosslink. Because they are not removed by developer, no image is formed. Preferably, the temperature is about 28° C. or less below the fog point at a heating time of two minutes, more preferably about 17° C. or less below the fog point at a heating time of two minutes and most preferably about 8° C. below the fog point. Typically, the heating temperature is about 110° C. to 150° C. The heating time can vary widely, depending on the method chosen for the application of heat as well as the other steps in the process. If a heat-transferring medium is used, the heating time will preferably be from about 30 seconds to about 30 minutes, more preferably from about 1 minute to about 5 minutes. When the imaged imageable element is heated in an oven, the heating time is preferably from about 1 minute to about 5 minutes.

Imaging produces an imaged element, which comprises a latent image of imaged and unimaged regions. Development of the imaged element to form an image converts the latent image to an image by removing either the imaged regions or the unimaged regions, revealing the hydrophilic surface of the underlying substrate.

High pH developers are typically used for positive working imageable elements. A high pH developer typically has a pH of at least about 11, more typically at least about 12, preferably from about 12 to about 14.

High pH developers comprise at least one alkali metal silicate, such as lithium silicate, sodium silicate, and/or potassium silicate. High pH developers comprise an alkali metal silicate having a $SiO_2$ to $M_2O$ weight ratio of at least about 0.3, in which M is the alkali metal. The amount of alkali metal silicate in the high pH developer is typically at least 20 g of $SiO_2$ per 1000 g of developer.

In addition to the alkali metal silicate, alkalinity can be provided by a suitable concentration of any suitable base, such as, for example, ammonium hydroxide, sodium hydroxide, lithium hydroxide, and/or potassium hydroxide. A developer may also comprise a buffer system to keep the pH relatively constant. Typically buffer systems include, for example: combinations of water-soluble amines, such as ethanol amine, diethanol amine, tri-ethanol amine, or tri-iso-propyl amine, with a sulfonic acid, such as benzene sulfonic acid or 4-toluene sulfonic acid; mixtures of ethylenediamine tetracetic acid (EDTA) and the tetra sodium salt of EDTA, mixtures of phosphate salts, such as mixtures of mono-alkali phosphate salts with tri-alkali phosphate salts; and mixtures of alkali borates and boric acid.

Optional components of developers are anionic, nonionic and amphoteric surfactants (up to 3% on the total composition weight), biocides (antimicrobial and/or antifungal agents), antifoaming agents or chelating agents (such as alkali gluconates), and thickening agents (water soluble or water dispersible polyhydroxy compounds such as glycerin or polyethylene glycol). However, high pH buffers typically do not contain organic solvents. Water typically comprises the balance of the developer. Typical commercially available high pH developers include: ProTherm™ Developer, Goldstar™ Developer, 4030 Developer, PD-1 Developer, and MX 1710 Developer, all available from Kodak Polychrome Graphics, Norwalk, Conn.

High pH developers have been used for negative working imageable elements in which the imageable composition comprises an infrared absorbing compound, an acid generator; an acid activatable crosslinking agent; and a polymeric binder. However, as described above, it has been found that certain of these negative working imageable elements can be efficiently developed with solvent based developers. Because highly alkaline solutions present a disposal problem and can absorb carbon dioxide from the air during use causing deterioration of the developer, solvent based developers are preferred.

Solvent based developers typically have a pH below 10.5. Solvent based alkaline developers comprise an organic solvent or a mixture of organic solvents and are typically silicate free. The developer is a single phase. Consequently, the organic solvent or mixture of organic solvents must be either miscible with water or sufficiently soluble in the developer that phase separation does not occur. The following solvents and mixtures thereof are suitable for use in the developer: the reaction products of phenol with ethylene oxide and propylene oxide, such as ethylene glycol phenyl ether (phenoxyethanol); benzyl alcohol; esters of ethylene glycol and of propylene glycol with acids having six or fewer carbon atoms, and ethers of ethylene glycol, diethylene glycol, and of propylene glycol with alkyl groups having six or fewer carbon atoms, such as 2-ethoxyethanol and 2-butoxyethanol. A single organic solvent or a mixture of organic solvents can be used. The organic solvent is typically present in the developer at a concentration of between about 0.5 wt % to about 15 wt %, based on the weight of the developer, preferably between about 3 wt % and about 5 wt %, based on the weight of the developer. Typical commercially available solvent based developers include 956 Developer, 955 Developer and SP200 available from Kodak Polychrome Graphics, Norwalk, Conn., USA.

The developer is typically applied to the imaged precursor by spraying the element with sufficient force to remove the imaged regions. Alternatively, development may carried out in a processor equipped with an immersion-type developing bath, a section for rinsing with water, a gumming section, a drying section, and a conductivity-measuring unit, or the imaged precursor may be brushed with the developer. In each instance, a printing plate is produced. Development may conveniently be carried out in a commercially available spray-on processor, such as an 85 NS (Kodak Polychrome Graphics).

Following development, the printing plate is rinsed with water and dried. Drying may be conveniently carried out by infrared radiators or with hot air. After drying, the printing plate may be treated with a gumming solution. A gumming solution comprises one or more water-soluble polymers, for example polyvinylalcohol, polymethacrylic acid, polymethacrylamide, polyhydroxyethyl-methacrylate, polyvinylmethylether, gelatin, and polysaccharide such as dextrin, pullulan, cellulose, gum arabic, and alginic acid. A preferred material is gum arabic.

A developed and gummed plate may also be baked to increase the run length of the plate. Baking can be carried out, for example at about 220° C. to about 240° C. for about 7 to 10 minutes, or at a temperature of 120° C. for 30 min.

INDUSTRIAL APPLICABILITY

The imageable elements of the invention are useful as lithographic printing plate precursors. They have improved dot stability. In addition, certain of the negative-working elements can be developed in solvent based developers.

Once the imageable element has been imaged and processed to form a printing plate, printing can be carried out by applying a fountain solution and then a lithographic ink to the image on its surface. Fountain solution is taken up by the surface of the substrate exposed by imaging and development, and the ink is taken up by the complementary regions. The ink is transferred to a suitable receiving material (such as cloth, paper, metal, glass or plastic) either directly or indirectly using an offset printing blanket to provide a desired impression of the image thereon.

The advantageous properties of this invention can be observed by reference to the following examples, which illustrate but do not limit the invention.

EXAMPLES

In the Examples, "coating solution" refers to the mixture of solvent or solvents and additives coated, even though some of the additives may be in suspension rather than in solution, and "total solids" refers to the total amount of nonvolatile material in the coating solution even though some of the additives may be nonvolatile liquids at ambient temperature. Except where indicated, the indicated percentages are percentages by weight based on the total solids in the coating solution.

Glossary

956 Developer Solvent based (phenoxyethanol) alkaline negative developer (Kodak Polychrome Graphics, Norwalk, Conn., USA)
ACR1262 polymer Copolymer containing 5–10% methyl methacrylate, 25–35% styrene and 5–15% methacrylic acid in 55–65% 2-methoxyethanol
BYK 307 Polyethoxylated dimethylpolysiloxane copolymer (Byk Chemie, Wallingford, Conn., USA)
CYMEL 303 Hexamethoxymethylmelamine (Cytec Industries, West Paterson, N.J.)
Copolymer 1 Copolymer of N-phenylmaleimide, methacrylamide, and methacrylic acid (45:35:20 mol %)
Copolymer 2 Copolymer of N-phenylmaleimide, methacrylamide, and methacrylic acid (40:35:25 mol %)
Copolymer 3 Acetal resin derived from polyvinyl alcohol; in which 19.5 mol % of the hydroxyl groups are functionalized with acetaldehyde, 45.6 mol % of the hydroxyl groups are functionalized with butyraldehyde, 10.3 mol % of the hydroxyl groups are functionalized with 4-carboxybenzaldehyde, 1.5 mol % of the hydroxyl groups are functionalized with acetic acid, and 23.1 mol % of the hydroxyl groups are unfunctionalized (Clariant, Wiesbaden, Germany)
Copolymer 4 Copolymer containing 9.2 mol % methacrylic acid, 34.82 mol % benzyl methacrylate, and 55.98 mol % methoxymethyl methacrylamide
D11 Ethanaminium, N-[4-[[4-(diethylamino)phenyl][4-(ethylamino)-1-naphthalenyl]methylene]-2,5-cyclohexadien-1-ylidene]-N-ethyl-, salt with 5-benzoyl-4-hydroxy-2-methoxybenzenesulfonic acid (1:1); colorant dye (see structure below) (PCAS, Longjumeau, France)
DOWANOL® PM Propylene glycol methyl ether (1-methoxy-2-propanol) (Dow, Midland, Mich., USA)
Dye 66e 2-[2-[3-[(1,3-Dihydro-1,3,3-trimethyl-2H-indol-2-ylidene)ethylidene]-2-(phenylthio)-1-cyclohexen-1-yl]ethenyl]-1,3,3-trimethyl-3H-indolium chloride; lambda$_{max}$=788 nm (Freundorfer, Munich, Germany)
KF654B 2-[2-[2-chloro-3-[(1,3-dihydro-1,3,3-trimethyl-2H-indol-2-ylidene)ethylidene]-1-cyclohexen-1-yl]ethenyl]-1,3,3-trimethyl-3H-Indolium bromide (Honeywell Specialty Chemicals, Morristown, N.J., USA)
MSHDS 2-Methoxy-4-(phenylamino)-benzenediazonium hexadecyl sulfate
N-13 Novolac resin; 100% m-cresol; MW 13,000 (Eastman Kodak Rochester, N.Y., USA)
ProTherm™ Developer Aqueous alkaline positive developer (Kodak Polychrome Graphics, Norwalk, Conn., USA)
Resole resin GP649D99 (Georgia-Pacific, Atlanta, Ga., USA)

SP 2000 Developer Subtractive plate developer (Kodak Polychrome Graphics, Norwalk, Conn., USA)

Trixene BI 7951 Blocked isocyanate in butyl acetate (Archway Sales, St. Louis, Mo., USA)

D11

Example 1

Preparation of 2-[2-[2-chloro-3-[(1,3-dihydro-1,3,3-trimethyl-2H-indol-2-ylidene)ethylidene]-1-cyclohexen-1-yl]ethenyl]-1,3,3-trimethyl-3H-Indolium, salt with 4,5-dihydroxy-1,3-Benzenedisulfonic acid (2:1) (Infrared absorbing compound Ia).

56.2 g of KF654B was dissolved in 1000 g of water and 1000 g of ethanol. 31.4 g of Disodium 4,5-dihydroxy-1,3-benzenedisulfonic acid (Aldrich, Milwaukee, Wis., USA) was dissolved in 200 g of water and 200 g of ethanol. The KF654B solution was slowly added to the solution of the sulfonic acid salt with stirring. The reaction mixture was stirred for another 10 minutes and stored in the dark at room temperature for 2 hours. The resulting precipitate was filtered off and dried in vacuum. Yield: 66 g.

Proton NMR (in DMSO-$d_6$): δ 1.67 (24H, s), 1.86 (4H, br), 2.72 (8H, t), 3.68 (12H, s), 6.30 (4H, d), 6.97 (1H, s), 7.20–7.35 (5H, m), 7.35–7.50 (8H, m), 7.63 (4H, d), 8.25 (4H, d), 8.88 (1H, s) and 10.58 (1H, s).

Example 2

Preparation of 2-[2-[3-[(1,3-Dihydro-1,3,3-trimethyl-2H-indol-2-ylidene)ethylidene]-2-phenylthio-1-cyclohexen-1-yl]ethenyl]-1,3,3-trimethyl-3H-indolium, salt with 4,5-dihydroxy-1,3-Benzenedisulfonic acid (2:1) (Infrared absorbing compound Ib).

5.9 g of Dye 66e was dissolved in 100 g of water and 100 g of methanol. 3.2 g of Disodium 4,5-dihydroxy-1,3-benzenedisulfonic acid (Aldrich, Milwaukee, Wis., USA) was dissolved in 30 g of water and 30 g of methanol. The Dye 66e solution was slowly added to the solution of the sulfonic acid salt with stirring. The reaction mixture was stored in the dark at room temperature for 2 hours. The resulting oily solid was collected by decanting the solvent, washed with 50 ml of water, and dried at ambient temperature for 48 hours. Yield: 6.9 g. The crude product contains small amount of methanol. It can be purified by recrystallization in water/methanol.

Proton NMR (in DMSO-$d_6$): δ 1.41 (24H, s), 1.92 (4H, br), 2.76 (8H, t), 3.64 (12H, s), 6.30 (4H, d), 6.98 (1H, s), 7.05–7.45 (23H, m), 7.52 (4H, d), 8.60 (4H, d), 8.87 (1H, s) and 10.58 (1H, s).

Example 3

Preparation of 2-[2-[3-[(1,3-Dihydro-1,3,3-trimethyl-2H-indol-2-ylidene)ethylidene]-2-phenylthio-1-cyclohexen-1-yl]ethenyl]-1,3,3-trimethyl-3H-indolium, salt with 10-camphorsulfonic acid (1:1) (Infrared absorbing compound Ic).

5.9 g of Dye 66e was dissolved in 100 g of water and 100 g of methanol. 7.0 g of Sodium 10-camphorsulfonic acid (Aldrich, Milwaukee, Wis., USA) was dissolved in 30 g of water and 30 g of methanol. The Dye 66e solution was slowly added to the solution of the sulfonic acid salt with stirring. No precipitate formed. The reaction mixture was stored in a laboratory hood at room temperature overnight. An oily solid formed when the methanol was evaporated. The solvent was decanted and the product washed with 50 ml of water. The product was dried at ambient temperature for 48 hours. Yield: 4.5 g.

Proton NMR (in DMSO-$d_6$): δ 0.73 (3H, s), 1.05 (3H, s), 1.25 (2H, d), 1.41 (12H, s), 1.70–2.00 (5H, m), 2.22 (1H, d), 2.35 (1H, d), 2.60–2.90 (6H, m), 3.65 (6H, s), 6.31 (2H, d), 7.05–7.45 (11H, m), 7.52 (2H, d) and 8.60 (2H, d).

Example 4

Preparation of 2-[2-[2-chloro-3-[(1,3-dihydro-1,3,3-trimethyl-2H-indol-2-ylidene)ethylidene]-1-cyclohexen-1-yl]ethenyl]-1,3,3-trimethyl-3H-Indolium, salt with 5-isatinsulfonate (2:1) (Infrared absorbing compound Id).

2.8 g of KF654B was dissolved in 50 g of water and 50 g of DOWANOL® PM. 2.0 g of 5-Isatinsulfonic acid sodium salt (Aldrich, Milwaukee, Wis., USA) was dissolved in 50 g of water and 50 g of DOWANOL® PM. The KF654B solution was slowly added to the solution of the sulfonic acid salt with stirring. The reaction mixture was stirred for another 10 minutes and stored in the dark at room temperature for 2 hours. The resulting precipitate was filtered off, washed with 50 ml of water, and dried at ambient temperature for 24 hours. Yield: 2.8 g.

Proton NMR (in DMSO-$d_6$): δ 1.66 (24H, s), 1.85 (4H, br), 2.71 (8H, t), 3.68 (12H, s), 6.30 (4H, d), 6.85 (1H, d), 7.20–7.35 (4H, m), 7.35–7.50 (8H, m,) 7.58 (1H, s), 7.62 (4H, d), 7.80 (1H, d), 8.24 (4H, d) and 11.10 (1H, s).

Comparative Example 1

Preparation of 2-[2-[2-chloro-3-[(1,3-dihydro-1,3,3-trimethyl-2H-indol-2-ylidene)ethylidene]-1-cyclohexen-1-yl]ethenyl]-1,3,3-trimethyl-3H-Indolium, salt with 2-hydroxy-4-methoxybenzophenone-5-sulfonic acid (1:1) (Infrared absorbing compound Ie).

5.6 g of KF654B was dissolved in 100 g of water and 100 g of DOWANOL® PM. 3.1 g of 2-hydroxy-4-methoxybenzophenone-5-sulfonic acid (TCI America, Portland, Oreg., USA) was dissolved in a mixture of 20 g of water and 30 g of DOWANOL® PM and neutralized with 0.85 g of sodium bicarbonate in 10 g of water. The KF654B solution was slowly added to the solution of the sulfonic acid salt with stirring. The reaction mixture was stirred for another 10 minutes and stored in the dark at room temperature for 2 hours. The resulting precipitate was filtered off, washed with 50 ml of water, and dried at ambient temperature for 24 hours. Yield: 7.4 g.

Proton NMR (in DMSO-$d_6$): δ 1.66 (12H, s), 1.85 (2H, br), 2.71 (4H, t), 3.68 (6H, s), 3.84 (3H, s), 6.30 (2H, d), 6.57 (1H, s), 7.20–7.35 (2H, m), 7.40–7.70 (11H, m), 7.92 (1H, s), 8.24 (2H, d) and 12.29 (1H, s).

Comparative Example 2

Preparation of 2-[2-[2-chloro-3-[(1,3-dihydro-1,3,3-trimethyl-2H-indol-2-ylidene)ethylidene]-1-cyclohexen-1-yl]ethenyl]-1,3,3-trimethyl-3H-Indolium, salt with 1,5-naphthalenedisulfonic acid (2:1) (Infrared absorbing compound If).

6.0 g of KF654B was dissolved in 100 g of water and 100 g of ethanol. 1.66 g of Disodium 1,5-naphthalenedisulfonic acid was dissolved in 20 g of water and 20 g of ethanol. The KF654B solution was slowly added to the solution of the sulfonic acid salt with stirring. The reaction mixture was stirred for another 10 minutes and stored in the dark at room temperature for 2 hours. The resulting precipitate was filtered off, washed with 30 ml of water, and dried at ambient temperature for 24 hours. Yield: 4.9 g.

Proton NMR (in DMSO-$d_6$): δ 1.66 (24H, s), 1.85 (4H, br), 2.71 (8H, t), 3.68 (12H, s), 6.30 (4H, d), 7.20–7.35 (4H, m), 7.35–7.50 (10H, m), 7.62 (4H, d), 7.92 (2H, d), 8.24 (4H, d) and 8.86 (2H, d).

Comparative Example 3

Preparation of 2-[2-[2-chloro-3-[(1,3-dihydro-1,3,3-trimethyl-2H-indol-2-ylidene)ethylidene]-1-cyclohexen-1-yl]ethenyl]-1,3,3-trimethyl-3H-Indolium, salt with 2,5-dihydroxy-Benzenesulfonic acid (1:1) (Infrared absorbing compound Ig).

5.6 g of KF654B was dissolved in 100 g of water and 100 g of DOWANOL® PM. 4.6 g of Potassium 2,5-hydroxybenzenesulfonic acid (Aldrich, Milwaukee, Wis., USA) was dissolved in 50 g of water and 50 g of DOWANOL® PM. The KF654B solution was slowly added to the solution of the sulfonic acid salt with stirring. The reaction mixture was stirred for another 10 minutes and stored in the dark at room temperature for 2 hours. The resulting precipitate was filtered off, washed with 50 ml of water, and dried at ambient temperature for 12 hours. Yield: 6.1 g.

Proton NMR (in DMSO-$d_6$): δ 1.67 (12H, s), 1.85 (2H, br), 2.71 (4H, t), 3.68 (6H, s), 6.30 (2H, d), 6.50–6.65 (2H, m), 6.88 (1H, d), 7.20–7.35 (2H, m), 7.35–7.50 (4H, m), 7.62 (2H, d), 8.24 (2H, d), 8.82 (1H, s) and 9.85 (1H, s).

Example 5

Preparation of MSHDS (2-Methoxy-4-(phenylamino)-benzenediazonium hexadecyl sulfate).

3.25 g of 2-methoxy-4-(phenylamino)-benzenediazonium bisulfate (Diversitec, Fort Collins, Colo.) in 50 ml of water was neutralized with 0.8 g of sodium bicarbonate in 25 ml water. 3.45 g of sodium hexadecyl sulfate (TCI America, Portland, Oreg., USA) was dissolved in 150 ml of water at 50° C. The solution of the diazonium salt as slowly added to the hexadecyl sulfate solution with stirring. The reaction mixture was stored in the dark at 0–5° C. for 12 hours. The resulting precipitate was filtered off and dried in vacuum. Yield: 5.4 g.

Proton NMR (in acetone-$d_6$): δ 0.87(3H,t), 1.31 (26H, m), 1.58 (2H, m), 3.90 (2H, t), 4.15 (3H,s), 6.90–7.60 (7H, m), 8.19 (1H, d), and 11.10 (1H,s).

TABLE 1

Structures of Infrared Absorbing Compounds

| # | Cation | Sulfonate Anion | Source |
|---|--------|-----------------|--------|
| Ia | [2-[2-[2-chloro-3-[(1,3-dihydro-1,3,3-trimethyl-2H-indol-2-ylidene)ethylidene]-1-cyclohexen-1-yl]ethenyl]-1,3,3-trimethyl-3H-indolium, Cl substituent] | [benzene with $^⊖O_3S$, $SO_3^⊖$, OH, OH substituents] | Example 1 |
| Ib | [same cation with SPh substituent] | [benzene with $^⊖O_3S$, $SO_3^⊖$, OH, OH substituents] | Example 2 |
| Ic | [same cation with SPh substituent] | [camphorsulfonate anion, $^⊖O_3SH_2C$, O] | Example 3 |

TABLE 1-continued

Structures of Infrared Absorbing Compounds

| # | Cation | Sulfonate Anion | Source |
|---|--------|-----------------|--------|
| Id | [structure] | [isatin-5-sulfonate structure] | Example 4 |
| Ie | [structure] | [2-hydroxy-4-methoxybenzophenone-5-sulfonate structure] | Compar. Example 1 |
| If | [structure] | [naphthalene-1,5-disulfonate structure] | Compar. Example 2 |
| Ig | [structure] | [2,5-dihydroxybenzenesulfonate structure] | Compar. Example 3 |
| Ih | [structure] | [p-toluenesulfonate structure] | Eastman Kodak |

Examples 6–9

These examples illustrate use of infrared absorbing compounds of the invention in imageable elements.

The following coating solution was prepared. 7.1 g of a DOWANOL® PM solution containing 25% of resole resin, 9.0 g of an acetone solution containing 34% N-13, 0.75 g of MSHDS, infrared absorbing compound as indicated below, 0.07 g of D11, and 0.21 g of a solution containing 10% of BYK 307 in 1-methoxy-2-propanol were combined in 80 g of 1-methoxy-2-propanol and 2.3 g of acetone. The coating solution was coated onto an electrochemically grained and anodized aluminum substrate post-treated with polyvinylphosphonic acid and the resulting element dried with hot air at 88° C. for about 2 minutes on a rotating drum. Dry coating weight: about 1.4 g/m$^2$. The resulting imageable elements were imaged on a CREO Trendsetter 3244x image setter (CreoScitex, Burnaby, British Columbia, Canada) at 830 nm IR laser at a power of 5.5 W and a range of drum speeds from 250 to 60 rpm (50 to 200 mJ/cm$^2$ exposure energy).

| Example | Infrared Absorbing Compound | Amount |
|---------|-----------------------------|--------|
| 6 | Ia | 0.56 g |
| 7 | Ib | 0.59 g |
| 8 | Ic | 0.58 g |
| 9 | Id | 0.56 g |

Figure 1:
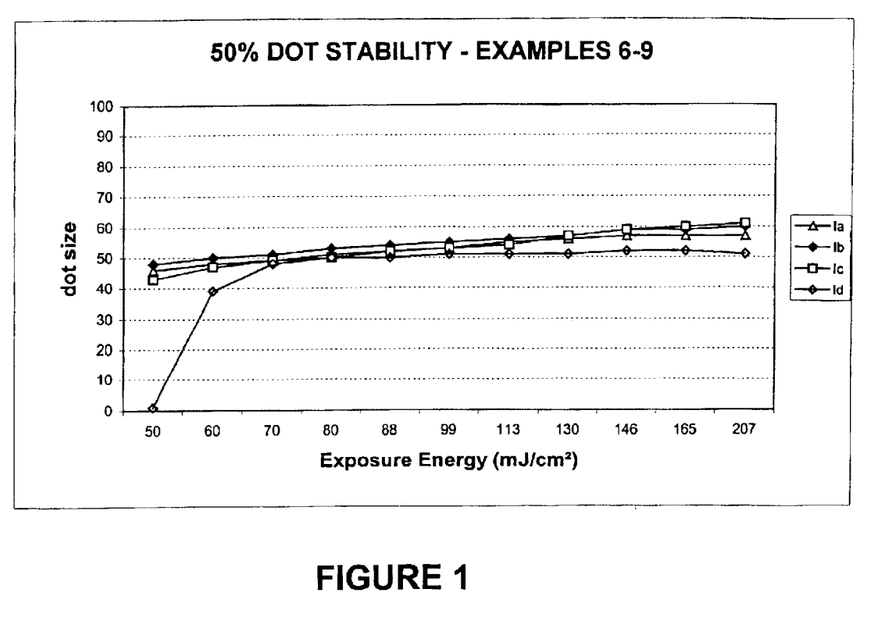
FIG. 1 shows the variation of the 50% dot with variation in exposure for infrared absorbing compounds of the invention.

The imaged imageable elements were preheated in a Heavy Duty Oven (Wisconsin Oven, East Troy, Wis., USA) at about 131° C. for about 2 minutes and developed in an Unigraph Quartz K85 processor (Glunz & Jensen, Elkwood, Va., USA) charged with ProTherm™ developer at 25° C. The stability of the 50% dots over the exposure range is shown in FIG. 1.

Comparative Examples 4–7

These examples illustrate the use of comparative infrared absorbing compounds in imageable elements. The procedure of Examples 6–9 was repeated with the infrared absorbing compounds indicated below.

| Example | Infrared Absorbing Compound | Amount |
|---------|-----------------------------|--------|
| C4 | Ie | 0.50 g |
| C5 | If | 0.50 g |
| C6 | Ig | 0.50 g |
| C7 | Ih | 0.50 g |

Figure 2:
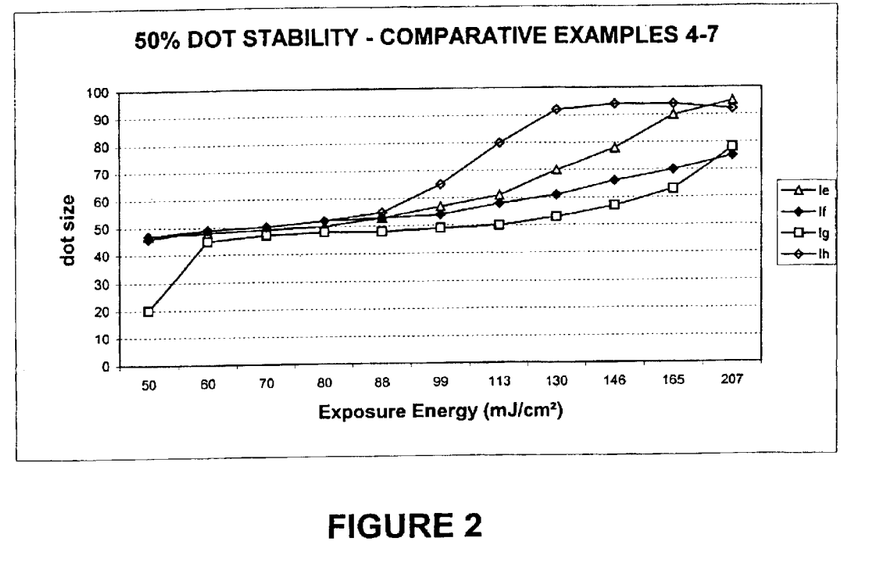
FIG. 2 shows the variation of the 50% dot with variation in exposure for comparative infrared absorbing compounds.

The stability of the 50% dots over the exposure range is shown in FIG. 2.

Comparative Example 8

7.2 g of a DOWANOL® PM solution containing 25% of resole resin, 8.8 g of an acetone solution containing 35% N-13, 0.75 g of MSHDS, 0.47 g of infrared absorbing compound 1h, 0.07 g of D11, and 0.2 g of DOWANOL® PM solution containing 10% BYK 307 were combined in 80 g of 1-methoxy-2-propanol and 2.3 g of acetone. The resulting coating solution was coated onto the substrate of Examples 6–9 and the resulting imageable element dried and imaged as in Examples 6–9. Dry coating weight: about 1.4 g/m². The resulting imageable element was imaged on a the CREO Trendsetter at 830 nm at a laser power of 5.5 W and a series of drum speeds from 60 to 250 rpm (exposure energy 50 to 210 mJ/cm²) and then preheated at 128° C. for about 2 minutes as described in Examples 6–9.

The imaged and preheated imageable element was cut into two parts. One part was developed in a Unigraph Quartz K85 processor (Glunz & Jensen, Elkwood, Va., USA) charged with ProTherm™ developer at 25° C. The minimum exposure energy to achieve maximum processed density with clean background was about 75 mJ/cm². The other part was developed in a Kodak Polychrome Graphics plate processor Model 850 (Kodak Polychrome Graphics) charged with 956 developer at 25° C. The resulting image showed retained coating on background (non-imaged area).

Example 10

The procedure of Comparative Example 7 was repeated except that the coating solution contained 4.3 g of a DOWANOL® PM solution containing 25% of resole resin, 2.2 g of Copolymer 4, 0.43 g of MSHDS, 0.47 g of infrared absorbing compound Ia, 0.07 g of D11, and 0.2 g of 10% BYK 307 in 92 g of 1-methoxy-2-propanol. The resulting imaged and preheated imageable element was developed in Kodak Polychrome Graphics plate processor Model 850 charged with 956 developer at 25° C. The minimum exposure energy to achieve maximum processed density was about 65 mJ/cm². The printing plate image obtained from 90 mJ/cm² exposure was mounted on a Miehle sheet-fed press and produced about 10,000 good impressions using a black ink containing 1.5% of calcium carbonate.

Example 11

The procedure of Example 10 was repeated except that the coating solution contained 4.3 g of a DOWANOL® PM solution containing 25% of resole resin, 2.2 g of Copolymer 3, 0.46 g of MSHDS, 0.47 g of infrared absorbing compound Ia, 0.07 g of D11, and 0.2 g of 10% BYK 307 in 92 g of 1-methoxy-2-propanol.

The minimum exposure energy to achieve maximum processed density was about 100 mJ/cm². The lithographic printing plate with an image obtained from the 110 mJ/cm² exposure was mounted on a Miehle sheet-fed press and produced about 1,000 good impressions using a black ink containing 1.5% of calcium carbonate.

Example 12

The procedure of Example 10 was repeated except that the coating solution contained 4.3 g of a DOWANOL® PM solution containing 25% of resole resin, 2.2 g of Copolymer 1, 0.43 g of MSHDS, 0.47 g of infrared absorbing compound Ia, 0.07 g of D11, and 0.2 g of 10% BYK 307 in a solvent mixture containing 73 g of 1-methoxy-2-propanol, 14 g of γ-butyrolactone and 5 g of water. The image was obtained with clean background and the minimum exposure energy to achieve maximum processed density was about 130 mJ/cm².

Example 13

The procedure of Example 10 was repeated except that the coating solution contained 4.3 g of a DOWANOL® PM solution containing 25% of resole resin, 2.2 g of Copolymer 2, 0.43 g of MSHDS, 0.47 g of infrared absorbing compound Ia, 0.07 g of D11, and 0.2 g of 10% BYK 307 in a solvent mixture containing 73 g of 1-methoxy-2-propanol, 14 g of γ-butyrolactone and 5 g of water. The image was obtained with clean background and the minimum exposure energy to achieve maximum processed density was about 170 mJ/cm².

Example 14

The procedure of Example 10 was repeated except that the coating solution contained 0.72 g of CYMEL 303, 2.2 g of Copolymer 4, 0.43 g of MSHDS, 0.47 g of infrared absorbing compound Ia, 0.07 g of D11, and 0.2 g of 10% BYK 307 in 92 g of 1-methoxy-2-propanol. The image was obtained with clean background and the minimum exposure energy to achieve maximum processed density was about 130 mJ/cm².

Example 15

The procedure of Example 10 was repeated except that the coating solution contained 4.3 g of a DOWANOL® PM solution containing 25% of resole resin, 2.2 g of Copolymer 4, 0.43 g of MSHDS, 0.50 g of infrared absorbing compound Ib, 0.07 g of D11, and 0.2 g of 10% BYK 307 in 92 g of 1-methoxy-2-propanol. The image was obtained with clean background and the minimum exposure energy to achieve maximum processed density was about 75 mJ/cm².

Example 16

The procedure of Example 10 was repeated except that the coating solution contained 4.3 g of a DOWANOL® PM solution containing 25% of resole resin, 2.2 g of ACR1262, 0.43 g of MSHDS, 0.47 g of infrared absorbing compound Ib, 0.07 g of D11, and 0.2 g of 10% BYK 307 in 92 g of 1-methoxy-2-propanol. The image was obtained with clean background at minimum exposure energy of about 75 mJ/cm².

Example 17

The procedure of Example 10 was repeated except that the coating solution contained 1.1 g of Trixene BI 7951, 2.2 g of Copolymer 4, 0.43 g of MSHDS, 0.47 g of infrared absorbing compound Ia, 0.07 g of D11, and 0.2 g of 10% BYK 307 in 92 g of 1-methoxy-2-propanol. The image was obtained with clean background and the minimum exposure energy to achieve maximum processed density was about 200 mJ/cm².

Example 18

This example illustrates the preparation of a sulfonyl amido phenolic resin.

18.0 g N-13 in 100 ml of dimethyl formamide was placed in a 500 ml flask equipped with a magnetic stirring bar and a condenser. 18.7 ml (13.6 g) of triethylamine and 21.1 ml (26.6 g) of p-toluenesulfonyl isocyanate were added to the solution with stirring and the resulting mixture heated in a 80° C. oil bath for two hours. The reaction mixture was poured slowly into a mixture of 2 L of water and 100 ml of glacial acetic acid to precipitate white polymer particles. The resulting polymer was filtered off and washed three times with 200 ml of water. 40.0 g of crude polymer was dissolved in 100 ml of acetone. To this solution, 250 ml of water was added to reprecipitate the polymer. The reprecipitated sulfonyl amido phenolic resin was filtered off, washed with 200 ml of water, and dried in ambient temperature overnight. Yield: 12 g.

Example 19

A coating solution was prepared by combining 7.2 g of a DOWANOL® PM solution containing 25% of resole resin, 3.0 g of the sulfonyl amido phenolic resin prepared in Example 18, 0.75 g of MSHDS, 0.56 g of 1a, 0.07 g of D11, and 0.2 g of BYK 307 in 86 g of 1-methoxy-2-propanol and 2 g of 2-butanone. The coating solution was coated onto an electrochemically grained and anodized aluminum substrate post-treated with polyvinylphosphonic acid and the resulting element dried with hot air at 88° C. for about 2 minutes on a rotating drum. The dry coating weight was about 1.4 g/m². The resulting imageable elements were imaged on the CREO Trendsetter 3244x image setter at 830 nm IR laser at a power of 5.5 W and a range of drum speeds from 250 to 60 rpm (50 to 210 mJ/cm² exposure energy).

The imaged imageable elements were preheated in a SPC Mini-HD Oven (Wisconsin Oven, East Troy, Wis., USA) at about 140° C. for about 2 minutes and developed in a Model 850 plate processor (Kodak Polychrome Graphics, Norwalk, Conn., USA) charged with SP 2000 developer at 25° C. The minimum exposure energy to achieve maximum processed density was about 70 mJ/cm².

The printing plate produced by imaging with 80 mJ/cm² was mounted on a Miehle sheet-fed press to produce about 20,000 good impressions using a black ink containing 1.5% of calcium carbonate.

Having described the invention, we now claim the following and their equivalents.

What is claimed is:

1. An infrared absorbing compound, the compound having the structure:

in which:

$R_1$ and $R_2$ are each independently an alkyl group, an aryl group, an aralkyl group, a hydroxyalkyl group, an alkoxyalkyl group, an aminoalkyl group, a carboxyalkyl group, or a sulfoalkyl group;

Y is hydrogen, halo, alkyl, diphenylamino, or phenylthio;

$Z_1$ and $Z_2$ are each independently a benzo group or a naphtho group;

$Z_3$ is two hydrogen atoms, a cyclohexene residue, or a cyclopentene residue;

$X_1$ and $X_2$ are each independently S, O, NH, $CH_2$, or $C(CH_3)_2$;

A is selected from the group consisting of 5-isatinsulfonate, 10-camphorsulfonate, and 4,5-dihydroxy-1,3-benzenedisulfonate; and n is 1 when A is 10-camphorsulfonate, and n is 2 when A is 5-isatinsulfonate or 4,5-dihydroxy-1,3-benzenedisulfonate.

2. The infrared absorbing compound of claim 1 in which A is 5-isatinsulfonate.

3. The infrared absorbing compound of claim 1 in which A is 10-camphorsulfonate.

4. The infrared absorbing compound of claim 1 in which A is 4,5-dihydroxy-1,3-benzenedisulfonate.

5. The infrared absorbing compound of claim 1 in which $R_1$ and $R_2$ are the same; $Z_1$ and $Z_2$ are the same; and $X_1$ and $X_2$ are the same.

6. The infrared absorbing compound of claim 5 in which:

$R_1$ and $R_2$ are each an alkyl group of one to four carbon atoms;

Y is hydrogen, chloro, phenylthio, or diphenylamino;

$Z_3$ is cyclohexene residue or a cyclopentene residue; and

$X_1$ and $X_2$ are each $C(CH_3)_2$.

7. The infrared absorbing compound of claim 6 in which A is 5-isatinsulfonate.

8. The infrared absorbing compound of claim 6 in which A is 10-camphorsulfonate.

9. The infrared absorbing compound of claim 6 in which A is 4,5-dihydroxy-1,3-benzenedisulfonate.

10. An imageable element, the imageable element comprising a layer of an imageable composition over a substrate, in which the imageable element comprises an infrared absorbing compound having the structure:

in which:

$R_1$ and $R_2$ are each independently an alkyl group, an aryl group, an aralkyl group, a hydroxyalkyl group, an alkoxyalkyl group, an aminoalkyl group, a carboxyalkyl group, or a sulfoalkyl group;

Y is hydrogen, halo, alkyl, diphenylamino, or phenylthio;

$Z_1$ and $Z_2$ are each independently a benzo group or a naphtho group;

$Z_3$ is two hydrogen atoms, a cyclohexene residue, or a cyclopentene residue;

$X_1$ and $X_2$ are each independently S, O, NH, $CH_2$, or $C(CH_3)_2$;

A is selected from the group consisting of 5-isatinsulfonate, 10-camphorsulfonate, and 4,5-dihydroxy-1,3-benzenedisulfonate; and n is 1 when A is 10-camphorsulfonate, and n is 2 when A is 5-isatinsulfonate or 4,5-dihydroxy-1,3-benzenedisulfonate.

11. The element of claim 10 in which the imageable composition comprises the infrared absorbing compound, an acid generator; an acid activatable crosslinking agent; and a polymeric binder.

12. The element of claim 11 in which the acid activatable crosslinking agent is a methylol melamine resin or a resole rein.

13. The element of claim 11 in which the polymeric binder is a novolac resin.

14. The element of claim 11 in which the polymeric binder is selected from the group consisting of:
(a) copolymers that contain about 25 to about 75 mol % of N-phenylmaleimide; about 10 to about 50 mol % of methacrylamide; and about 5 to about 30 mol % of methacrylic acid;
(b) copolymers that contain a reactive pendent group capable of undergoing acid crosslinking, the reactive pendent group selected from the group consisting of carboxylic acid, sulfonamide, and alkoxymethyl amide;
(c) functionalized polyvinyl alcohols in which 10 mol % to 60 mol % of the hydroxyl groups are unfunctionalized; about 1 mol % to 30 mol % of the hydroxyl groups are functionalized with —OCOR$_3$ groups; 5 mol % to 60 mol % of the hydroxyl groups are functionalized with an aldehyde of the structure R$_4$CHO; 0 mol % to 60 mol % of the hydroxyl groups are functionalized with an aldehyde of the structure R$_5$CHO; and 1 mol % to 40 mol % of the hydroxyl groups are functionalized with an aldehyde that contains a carboxyl group; in which R$_3$, R$_4$, and R$_5$ are each hydrogen or an alkyl group of one to eighteen carbon atoms; and
(d) sulfonyl amido substituted phenolic resins of the structure:

in which:
each R$_7$ is hydrogen or —C(O)—NH—SO2—R$_{11}$ with the proviso that at least 20 mol % of the R$_7$ groups are —C(O)—NH—SO2—R$_{11}$ R$_{11}$ is alkyl, aryl, or aralkyl; each R$_8$ is hydrogen or alkyl; each R$_9$ and R$_{10}$ is each independently hydrogen or alkyl; and n is greater than 20.

15. The element of claim 11 in which the acid generator is a salt in which the cation is iodonium, sulfonium, or diazonium, and the anion is an organic sulfate, an alkyl sulfonate, an aryl sulfonate, or an organic thiosulfate.

16. The element of claim 11 in which R$_1$ and R$_2$ are the same; Z$_1$ and Z$_2$ are the same; and X$_1$ and X$_2$ are the same.

17. The element of claim 11 in which:
R$_1$ and R$_2$ are each independently an alkyl group, an aryl group, an aralkyl group, a hydroxyalkyl group, an alkoxyalkyl group, an aminoalkyl group, a carboxyalkyl group, or a sulfoalkyl group;
Y is hydrogen, chloro, phenylthio, or diphenylamino;
Z$_3$ is cyclohexene residue or a cyclopentene residue; and
X$_1$ and X$_2$ are each C(CH$_3$)$_2$.

18. The element of claim 17 in which the polymeric binder is selected from the group consisting of:
(a) copolymers that contain about 25 to about 75 mol % of N-phenylmaleimide; about 10 to about 50 mol % of methacrylamide; and about 5 to about 30 mol % of methacrylic acid;

(b) copolymers that contain a reactive pendent group capable of undergoing acid crosslinking, the reactive pendent group selected from the group consisting of carboxylic acid, sulfonamide, and alkoxymethyl amide;
(c) functionalized polyvinyl alcohols in which 10 mol % to 60 mol % of the hydroxyl groups are unfunctionalized; about 1 mol % to 30 mol % of the hydroxyl groups are functionalized with —OCOR$_3$ groups; 5 mol % to 60 mol % of the hydroxyl groups are functionalized with an aldehyde of the structure R$_4$CHO; 0 mol % to 60 mol % of the hydroxyl groups are functionalized with an aldehyde of the structure R$_5$CHO; and 1 mol % to 40 mol % of the hydroxyl groups are functionalized with an aldehyde that contains a carboxyl group; in which R$_3$, R$_4$, and R$_5$ are each hydrogen or an alkyl group of one to eighteen carbon atoms; and
(d) sulfonyl amido substituted phenolic resins of the structure:

in which:
each R$_7$ is hydrogen or —C(O)—NH—SO2—R$_{11}$ with the proviso that at least 20 mol % of the R$_7$ groups are —C(O)—NH—SO2—R$_{11}$; R$_{11}$ is alkyl, aryl, or aralkyl; each R$_8$ is hydrogen or alkyl; each R$_9$ and R$_{10}$ is each independently hydrogen or alkyl; and n is greater than 20.

19. The element of claim 18 in which the acid generator is a salt in which the cation is iodonium, sulfonium, or diazonium, and the anion is an organic sulfate, an alkyl sulfonate, an aryl sulfonate, or an organic thiosulfate.

20. The element of claim 19 in which A is 5-isatinsulfonate.

21. The element of claim 19 in which A is 10-camphorsulfonate.

22. The element of claim 19 in which A is 4,5-dihydroxy-1,3-benzenedisulfonate.

23. The element of claim 11 in which A is 5-isatinsulfonate.

24. The element of claim 11 in which A is 10-camphorsulfonate.

25. The element of claim 11 in which A is 4,5-dihydroxy-1,3-benzenedisulfonate.

26. The element of claim 10 in which the element additionally comprises an underlayer between the imageable layer and the substrate.

27. The element of claim 26 in which the infrared absorbing compound is either in the underlayer or in an absorber layer between the imageable layer and the underlayer.

28. A method for forming an image, the method comprising, in order, the steps of:
thermally imaging an imageable element comprising a layer of an imageable composition on a substrate and forming an imaged imageable element comprising imaged and unimaged regions in the layer of imageable composition; and developing the imaged imageable element in a developer and removing the unimaged regions;
in which:
the imageable composition comprises an infrared absorbing compound, an acid generator; an acid activatable crosslinking agent; and a polymeric binder; and
the infrared absorbing compound has the structure:

in which:
$R_1$ and $R_2$ are each independently an alkyl group, an aryl group, an aralkyl group, a hydroxyalkyl group, an alkoxyalkyl group, an aminoalkyl group, a carboxyalkyl group, or a sulfoalkyl group;
Y is hydrogen, halo, alkyl, diphenylamino, or phenylthio;
$Z_1$ and $Z_2$ are each independently a benzo group or a naphtho group;
$Z_3$ is two hydrogen atoms, a cyclohexene residue, or a cyclopentene residue;
$X_1$ and $X_2$ are each independently S, O, NH, $CH_2$, or $C(CH_3)_2$;
A is selected from the group consisting of 5-isatinsulfonate, 10-camphorsulfonate, and 4,5-dihydroxy-1,3-benzenedisulfonate; and
n is 1 when A is 5-isatinsulfonate or 10-camphorsulfonate, and n is 2 when A is 4,5-dihydroxy-1,3-benzenedisulfonate.

29. The method of claim 28 additionally comprising the step of heating the imaged imageable element after imaging and before developing.

30. The method of claim 28 in which imaging is carried out with infrared radiation.

31. The method of claim 28 in which $R_1$ and $R_2$ are the same; $Z_1$ and $Z_2$ are the same; and $X_1$ and $X_2$ are the same.

32. A method for forming an image, the method comprising, in order, the steps of:
thermally imaging an imageable element comprising a layer of an imageable composition on a substrate and forming an imaged imageable element comprising imaged and unimaged regions in the layer of imageable composition; and
developing the imaged imageable element in a solvent based developer and removing the unimaged regions;
in which:
the solvent based developer comprises about 0.5 wt % to about 15 wt %, based on the weight of the developer, of an organic solvent and the developer has a pH of less than 10.5;
the imageable composition comprises an infrared absorbing compound, an acid generator, an acid activatable crosslinking agent, and a polymeric binder; and
the polymeric binder is:
(a) a copolymer that contains about 25 to about 75 mol % of N-phenylmaleimide; about 10 to about 50 mol % of methacrylamide; and about 5 to about 30 mol % of methacrylic acid;
(b) a copolymer that contains a reactive pendent group capable of undergoing acid crosslinking, the reactive pendent group selected from the group consisting of carboxylic acid, sulfonamide, and alkoxymethyl amide;
(c) a functionalized polyvinyl alcohol in which 10 mol % to 60 mol % of the hydroxyl groups are unfunctionalized; about 1 mol % to 30 mol % of the hydroxyl groups are functionalized with —$OCOR_3$ groups; 5 mol % to 60 mol % of the hydroxyl groups are functionalized with an aldehyde of the structure $R_4CHO$; 0 mol % to 60 mol % of the hydroxyl groups are functionalized with an aldehyde of the structure $R_5CHO$; and 1 mol % to 40 mol % of the hydroxyl groups are functionalized with an aldehyde that contains a carboxyl group; in which $R_3$, $R_4$, and $R_5$ are each hydrogen or an alkyl group of one to eighteen carbon atoms; or
(d) a sulfonyl amido substituted phenolic resin of the structure:

in which:
each $R_7$ is hydrogen or —C(O)—NH—SO2—$R_{11}$ with the proviso that at least 20 mol % of the $R_7$ groups are —C(O)—NH—SO2—$R_{11}$; $R_{11}$ is alkyl, aryl, or aralkyl; each $R_8$ is hydrogen or alkyl; each $R_9$ and $R_{10}$ is each independently hydrogen or alkyl; and n is greater than 20.

33. The method of claim 32 additionally comprising the step of heating the imaged imageable element after imaging and before developing.

34. The method of claim 33 in which the polymeric binder is (a), the copolymer that contains about 25 to about 75 mol % of N-phenylmaleimide; about 10 to about 50 mol % of methacrylamide; and about 5 to about 30 mol % of methacrylic acid.

35. The method of claim 33 in which the polymeric binder is (b), the copolymer that contains a reactive pendent group capable of undergoing acid crosslinking.

36. The method of claim 33 in which the polymeric binder is (c), the functionalized polyvinyl alcohol.

37. The method of claim 33 in which the polymeric binder is (d), the sulfonyl amido substituted phenolic resin of the structure:

38. The method of claim 32 in which the binder is the copolymer that contain about 25 to about 75 mol % of N-phenylmaleimide; about 10 to about 50 mol % of methacrylamide; and about 5 to about 30 mol % of methacrylic acid.

39. The method of claim 32 in which the binder is the copolymer that contain a reactive pendent group capable of undergoing acid crosslinking.

40. The method of claim 32 in which the binder is the functionalized polyvinyl alcohol.

41. The method of claim 32 in which the binder is the sulfonyl amido substituted phenolic resin.

42. A method for forming an image, the method comprising, in order, the steps of:

thermally imaging an imageable element comprising a layer of an imageable composition on a substrate and forming an imaged imageable element comprising imaged and unimaged regions in the layer of imageable composition; and developing the imaged imageable element in a solvent based developer and removing the unimaged regions;

in which:

the solvent based developer comprises about 0.5 wt % to about 15 wt %, based on the weight of the developer, of an organic solvent and the developer has a pH of less than 10.5;

the imageable composition comprises an infrared absorbing compound, an acid generator, an acid activatable crosslinking agent, and a polymeric binder;

the polymeric binder is:

(a) a copolymer that contains about 25 to about 75 mol % of N-phenylmaleimide; about 10 to about 50 mol % of methacrylamide; and about 5 to about 30 mol % of methacrylic acid;

(b) a copolymer that contains a reactive pendent group capable of undergoing acid crosslinking, the reactive pendent group selected from the group consisting of carboxylic acid, sulfonamide, and alkoxymethyl amide;

(c) a functionalized polyvinyl alcohol in which 10 mol % to 60 mol % of the hydroxyl groups are unfunctionalized; about 1 mol % to 30 mol % of the hydroxyl groups are functionalized with —OCOR$_3$ groups; 5 mol % to 60 mol % of the hydroxyl groups are functionalized with an aldehyde of the structure R$_4$CHO; 0 mol % to 60 mol % of the hydroxyl groups are functionalized with an aldehyde of the structure R$_5$CHO; and 1 mol % to 40 mol % of the hydroxyl groups are functionalized with an aldehyde that contains a carboxyl group; in which R$_3$, R$_4$, are R$_5$ each hydrogen or an alkyl group of one to eighteen carbon atoms; or (d) a sulfonyl amido substituted phenolic resin of the structure:

in which each R$_7$ is hydrogen or —C(O)—NH—SO2-R$_{11}$ with the proviso that at least 20 mol % of the R$_7$ groups are —C(O)—NH—SO2—R$_{11}$; R$_{11}$ is alkyl, aryl, or aralkyl; each R$_8$ is hydrogen or alkyl; each R$_9$ and R$_{10}$ is each independently hydrogen or alkyl; and n is greater than 20; and the infrared absorbing compound has the structure:

in which:

R$_1$ and R$_2$ are each independently an alkyl group, an aryl group, an aralkyl group, a hydroxyalkyl group, an alkoxyalkyl group, an aminoalkyl group, a carboxyalkyl group, or a sulfoalkyl group;

Y is hydrogen, halo, alkyl, diphenylamino, or phenylthio;

Z$_1$ and Z$_2$ are each independently a benzo group or a naphtho group;

Z$_3$ is two hydrogen atoms, a cyclohexene residue, or a cyclopentene residue;

X$_1$ and X$_2$ are each independently S, O, NH, CH$_2$, or C(CH$_3$)$_2$;

A is selected from the group consisting of 5-isatinsulfonate, 10-camphorsulfonate, and 4,5-dihydroxy-1,3-benzenedisulfonate; and n is 1 when A is 5-isatinsulfonate or 10-camphorsulfonate, and n is 2 when A is 4,5-dihydroxy-1,3-benzenedisulfonate.

43. The method of claim 42 in which imaging is carried out with infrared radiation.

44. The method of claim 43 in which R$_1$ and R$_2$ are the same; Z$_1$ and Z$_2$ are the same; and X$_1$ and X$_2$ are the same.

* * * * *